(12) United States Patent
Zhou et al.

(10) Patent No.: US 10,858,098 B2
(45) Date of Patent: Dec. 8, 2020

(54) FALLING-RESISTANT AND ANTI-DRIFTING UNMANNED AERIAL VEHICLE

(71) Applicant: South China Agricultural University, Guangdong (CN)

(72) Inventors: Zhiyan Zhou, Guangdong (CN); Chu Cheng, Guangdong (CN); Ying Zang, Guangdong (CN); Xiuyan Gu, Guangdong (CN); Yubin Lan, Guangdong (CN); Xiwen Luo, Guangdong (CN); Shengde Chen, Guangdong (CN)

(73) Assignee: SOUTH CHINA AGRICULTURAL UNIVERSITY, Guangdong (CN)

( * ) Notice: Subject to any disclaimer, the term of this patent is extended or adjusted under 35 U.S.C. 154(b) by 237 days.

(21) Appl. No.: 15/759,155

(22) PCT Filed: Jul. 9, 2015

(86) PCT No.: PCT/CN2015/083643
§ 371 (c)(1),
(2) Date: Mar. 9, 2018

(87) PCT Pub. No.: WO2017/004826
PCT Pub. Date: Jan. 12, 2017

(65) Prior Publication Data
US 2018/0229840 A1  Aug. 16, 2018

(51) Int. Cl.
*B64C 39/02* (2006.01)
*B64D 1/18* (2006.01)
(Continued)

(52) U.S. Cl.
CPC ............. *B64C 39/024* (2013.01); *B64B 1/20* (2013.01); *B64B 1/34* (2013.01); *B64C 3/185* (2013.01); *B64C 3/187* (2013.01); *B64C 25/06* (2013.01); *B64C 29/0025* (2013.01); *B64D 1/18* (2013.01); *B64D 45/06* (2013.01); *B64C 2201/022* (2013.01); *B64C 2201/128* (2013.01)

(58) Field of Classification Search
CPC ... B64C 39/024; B64C 25/06; B64C 29/0025; B64C 3/187; B64C 3/185; B64C 1/34;
(Continued)

(56) References Cited

U.S. PATENT DOCUMENTS 3,738,597 A * 6/1973 Earl ......................... B60V 3/08
                                                          244/100 A
3,907,218 A * 9/1975 Miller ...................... B64C 1/34
                                                          244/5
(Continued)

FOREIGN PATENT DOCUMENTS

CN      103274042 A    9/2013
CN      104044734 A    9/2014
(Continued)

*Primary Examiner* — Medhat Badawi
*Assistant Examiner* — Vincente Rodriguez
(74) *Attorney, Agent, or Firm* — Muncy, Geissler, Olds & Lowe, P.C.

(57) ABSTRACT

A falling-resistant and anti-drifting unmanned aerial vehicle has a main body and at least one rotor wing thereon. Both sides of the main body have a wing with an airbag filled with gas lighter than air. Bulges protruding downwards are arranged at the bottoms of the airbag. The two airbags are at the same height symmetrically arranged based on the main body. The airbag can function as an undercarriage when the aircraft lands down, and as a buffer when crash landing and then reduce damage to the main body. If the aircraft falls in water, the aircraft can float on the water to avoid damage caused by sinking. As bulges protruding downwards are arranged at the bottoms of the airbags, in spraying operation, side wing can be relatively well baffled by the bulges in case of side wing blowing in the flying process, resulting in less droplets draft.

6 Claims, 4 Drawing Sheets

(51) Int. Cl.
*B64D 45/06* (2006.01)
*B64C 29/00* (2006.01)
*B64C 25/06* (2006.01)
*B64B 1/20* (2006.01)
*B64B 1/34* (2006.01)
*B64C 3/18* (2006.01)

(58) Field of Classification Search
CPC . B64C 1/20; B64C 2201/00; B64C 2201/141; B64D 45/06; B60V 3/08; B64B 2201/00; A63H 27/00
See application file for complete search history.

(56) References Cited

U.S. PATENT DOCUMENTS

| | | | | |
|---|---|---|---|---|
| 5,035,382 A | * | 7/1991 | Lissaman | A63H 27/00 244/120 |
| 5,765,778 A | * | 6/1998 | Otsuka | B64C 25/56 244/100 A |
| 5,823,468 A | * | 10/1998 | Bothe | B64B 1/08 244/2 |
| 7,156,033 B2 | * | 1/2007 | Mears | B64D 25/18 114/123 |
| 8,123,162 B2 | * | 2/2012 | Sirkis | B64C 39/024 244/100 A |
| 2012/0234968 A1 | | 9/2012 | Smith | |
| 2013/0105635 A1 | | 5/2013 | Alzu'bi et al. | |
| 2013/0134254 A1 | | 5/2013 | Moore | |
| 2016/0311518 A1 | * | 10/2016 | Wiebe | B64C 3/20 |

FOREIGN PATENT DOCUMENTS

| | | |
|---|---|---|
| CN | 104260875 A | 1/2015 |
| CN | 104401499 A | 3/2015 |
| CN | 204297073 U | 4/2015 |
| CN | 104724284 A | 6/2015 |
| CN | 105000186 A | 10/2015 |
| CN | 204916190 U | 12/2015 |

* cited by examiner

FALLING-RESISTANT AND ANTI-DRIFTING UNMANNED AERIAL VEHICLE

FIELD

The invention relates to an aircraft and in particular relates to a falling-resistant and anti-drifting unmanned aerial vehicle.

BACKGROUND

An agricultural aircraft has high working efficiency, for example, in weed killing operation of wheat fields, the efficiency of aerial spraying is 5-7 times of that of ground mechanical spraying and is 200-250 times of that of manual spraying, and aerial spraying is good in completing spraying in a short time and prevention and control effect of outburst and fulminic insect and disease. Aerial spraying is not limited by crop growth vigor, and particularly the case that rows of crops are not clear after the crops grow up densely. And aerial operation can solve the problem that a ground machine cannot work in fields in later crop growth periods. Compared with field operation, aerial operation of aircrafts also has the characteristics that the operation cost is lower, no wheel track is made, crops are not damaged, and the like.

At present, aircrafts for agricultural aerial operation mainly include manned agricultural aircrafts with large-size fixed wing, helicopters, powered parachutes and unmanned airplanes with fixed wing, single-rotor wing helicopters, non-coaxial multi-rotor wing helicopters, and the like.

A manned airplane is high in working efficiency, but has multiple problems that a special airport is needed, the maintenance cost is high, air traffic control is strict, and the like. Due to the characteristics that no special airport or professional pilot is needed, the maintenance cost is low, the air traffic control is not strict and the like, and the advantages of being low in flying height, high in working efficiency and precision, wide in operation landform adaptability and the like, an unmanned helicopter gets more and more extensive attention in agricultural production.

However, the unmanned single-rotor wing helicopters and the non-coaxial multi-rotor wing helicopters are still too expensive for a common farmer, in addition, an operator shall be certainly educated, or else air crash accidents such as "falling" and "explosion" can be caused by mal-operation, which not only brings about great loss to the airplane self, but also seriously damages facilities on the airplane and crops on the ground, and meanwhile threat the security of operators on the ground, thus the use security of the unmanned helicopters is one of key problems restricting rapid development of the unmanned helicopters. An undercarriage is a significant device of an unmanned aerial vehicle to ensure safe taking off and landing down and has a certain buffer function if the aircraft falls down due to malfunction. However, conventional undercarriage device has a very limited buffer function, thus a novel undercarriage device needs to be developed urgently so as to reduce the falling loss of the unmanned aerial vehicle to the maximum extent.

In addition, the unmanned aerial vehicle has a small effective load capacity, so that a spraying operation mode of a high concentration and a low capacity is generally adopted in plant protection operation, and because of relatively small particle sizes, droplets can be easily interfered by natural wind and are drifted before entering crown layers of crops, so that the medicinal effect of plant protection operation may be relatively greatly affected.

SUMMARY

To overcome the defects of the prior art, the invention provides a falling-resistant and anti-drifting unmanned aerial vehicle which is good in security, can greatly reduce the falling loss of a unmanned aerial vehicle for plant protection, and also reduce droplet drifting.

To achieve the purpose, according to the technical scheme, the invention provides a falling-resistant and anti-drifting unmanned aerial vehicle which comprises a main body, wherein airbags connected with the main body are respectively arranged on two opposite sides of the main body.

According to the invention, as airbags are arranged on both sides of the main body, the airbag can function as an undercarriage when the aircraft lands down; the airbag can function as a buffer if the aircraft crash lands and then reduce damage to the main body. If the aircraft falls in water by accident, the aircraft can float on the water under the action of the airbags to avoid damage caused by sinking of the aircraft in the water, resulting in improvement of the security performance of the aircraft. In addition, the airbags can play a role to baffle side wind to a certain extent and reduce the droplet drift.

Furthermore, at least one rotor wing is arranged on the main body, and the airbags take the shape of an airship. By using rotor wings to drive the aircraft, it can improve the flexibility, reduce the probability of operation accidents such as crash and improve the operation security. The airship-shaped airbags can effectively reduce the resistance of wind in flying, and thus improve the ability of continuous flight.

Furthermore, bulges which protrude downwards are arranged at the bottoms of the airbags. In spraying operation, side wing can be relatively well baffled by the bulges in case of side wing blowing in the flying process, resulting in less droplets draft, and thus the utilization efficiency of the droplets is improved.

Furthermore, the airbags are filled with gas lighter than air. The self-gravity of the aircraft and the weight of an operation cabin can be partially or completely counteracted by buoyancy of the airbags, so that the effective load of the aircraft is increased and the operation efficiency is improved.

Furthermore, wings are respectively arranged on two opposite sides of the main body, and the airbags are fixed on the wings. In flying, the wing can also provide certain lift force, and thus to increase the effective load of the aircraft.

Furthermore, the main body is connected with the wings through a first connecting beam and second connecting beams. Due to double-beam connection, the freedom degrees of the wings can be limited.

Furthermore, to reduce shaking of the aircraft in flying, the first connecting beam penetrates through two sides of the bottom of the main body, the wings on two sides of the main body are respectively fixed on the first connecting beam on two sides of the main body, the main body can be rotated around the first connecting beam, clamping grooves are respectively formed in two opposite sides of the bottom of the main body, the end of each second connecting beam connected with the main body is clamped in the clamping groove, and the second connecting beams can be moved inside the clamping grooves. As that the second connecting beams can be moved inside the clamping grooves, it can change the included angles between the main body and the wings, so as to meet the operation and control requirements on speeds and posture variation of the aircraft in the flying process are met, and thus instability of the aircraft in flying can be reduced.

Furthermore, a plurality of wing ribs in a same direction are arranged in the wing, the outer side of the wing rib is wrapped by soft sheath, a first through hole matched with the first connecting beam and second through holes matched with the second connecting beams are respectively formed in each wing rib, the first connecting beam penetrates through the first through hole of each wing rib, and the second connecting beams penetrate through the second through holes of the wing ribs. The wing ribs can share pressure with the wings, and thus the shapes of the wings can be maintained.

Furthermore, in order to ensure the shape stability of the airbags, ensure that the airbags are not extruded, rolled transversely or moved horizontally in air, ensure the stability of aerial operation, and improve the precision of aerial operation, support frameworks wrapped by soft sheath are arranged inside the airbags, the first connecting beam and the second connecting beams penetrate through the airbags, and the first connecting beam and the second connecting beams are both connected with the support frameworks.

Furthermore, to ensure the mounting reliability of the first connecting beam, a buckle component is arranged at the bottom of the main body, through which the first connecting beam is fixed at the bottom of the main body. Then the main body is connected with the wings and the airbags as a whole to prevent from falling off, and it can conveniently realize rapid disassembly to the whole.

The falling-resistant and anti-drifting unmanned aerial vehicle has the beneficial effects that:

1. As airbags are arranged on two sides of the main body, the airbag can function as an undercarriage when the aircraft lands down; the airbag can function as a buffer crash lands and then reduce damage to the main body. If the aircraft falls in water by accident, the aircraft can float on the water to avoid damage caused by sinking of the aircraft in the water, resulting in improvement of the security performance of the aircraft.

2. A mode combined multiple airbags, rotor wing and fixed wings integrate the advantages of common airships, helicopters and fixed wing airplanes. The airbags in the shape of an airship can effectively reduce the resistance of wind in flying and improve the ability of continuous flight. The airbags are filled with the gas lighter than air, then the self-gravity of the aircraft and the weight of an operation cabin can be partially or completely counteracted by buoyancy of the airbags, so that the effective load of the aircraft is increased, and the operation efficiency is improved. By using rotor wings to drive the aircraft, it can improve the flexibility. As the airbags are fixed on the wings, then certain lift force can be also provided by the wings in flying, and thus the effective load of the aircraft is increased.

3. Bulges which protrude downwards are arranged at the bottoms of the airbags. In spraying operation, side wing can be relatively well baffled by the bulges in case of side wing blowing in the flying process, resulting in less droplets draft, and thus the utilization efficiency of the droplets is improved.

4. The bottom of the main body is equipped with a buckle component and clamping groove, so that included angles between the main body and the wings can be changed, meeting the operation and control requirements on speeds and posture variation of the aircraft in the flying process, and so that the main body can be connected with the wings and the airbags as a whole to avoid falling off and conveniently realizing rapid disassembly to the whole.

DETAILED DESCRIPTION

Figure 1:
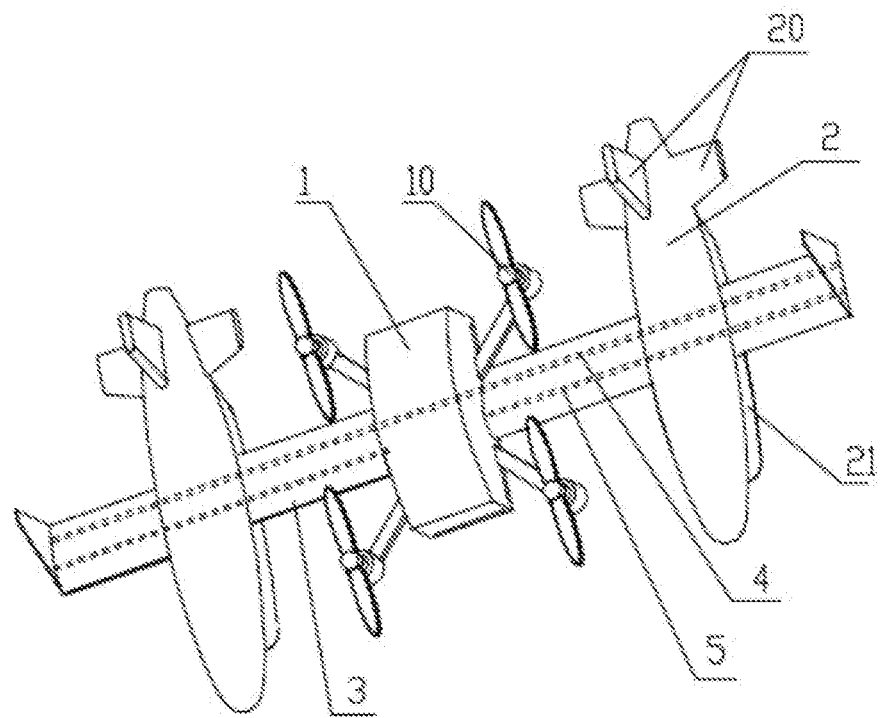
FIG. 1 is a schematic diagram of a falling-resistant and anti-drifting unmanned aerial vehicle according to the invention.
Figure 2:
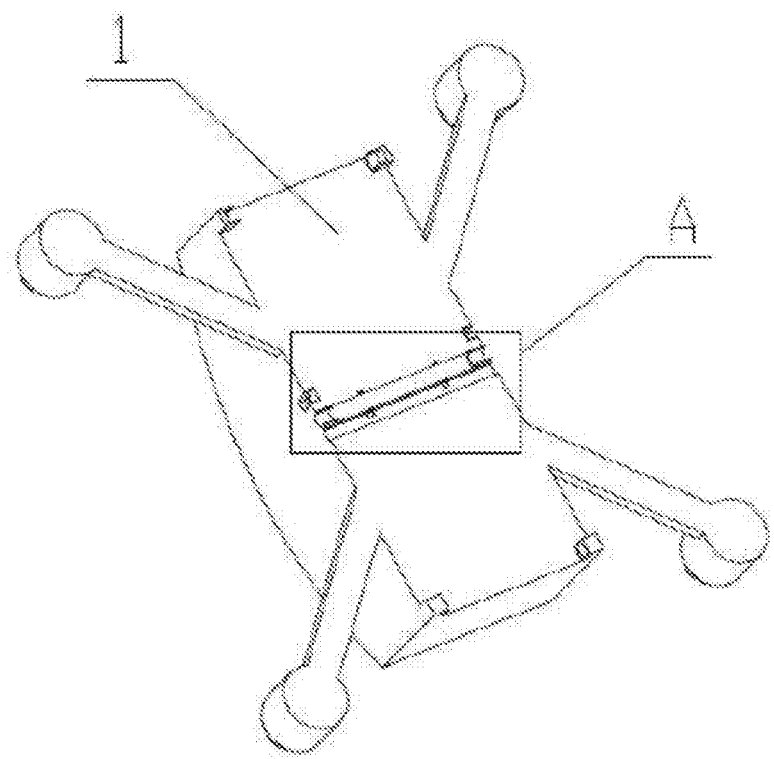
FIG. 2 is a schematic diagram of a bottom structure (the bottom plate is dismounted) of the main body according to the invention.
Figure 3:
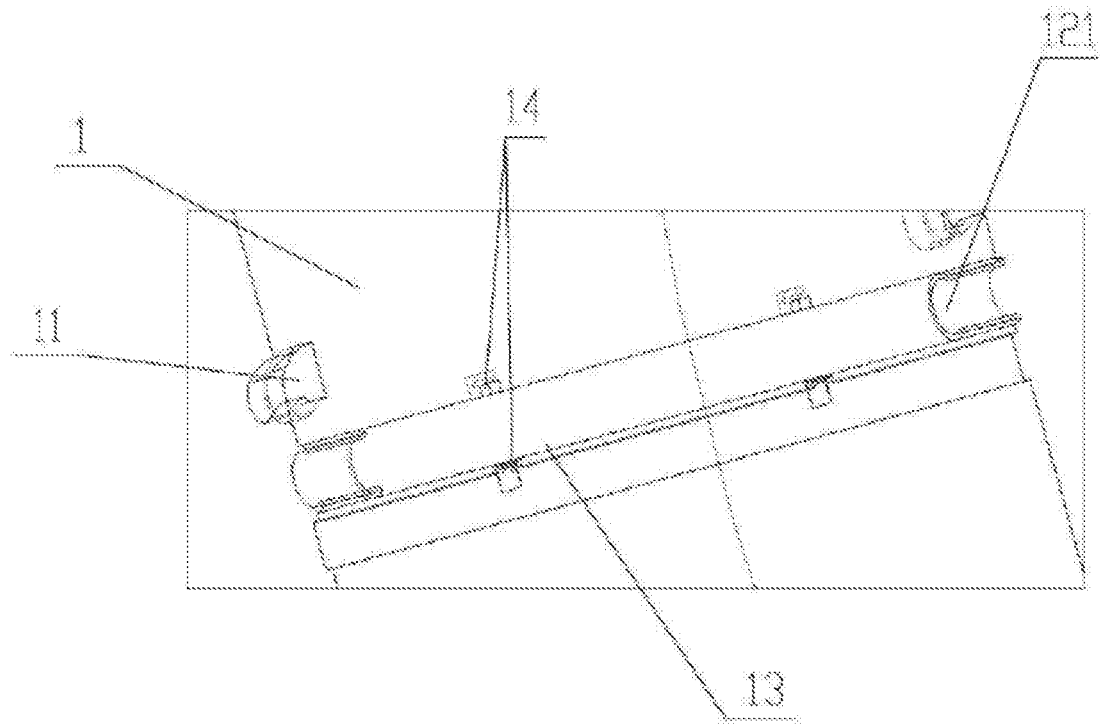
FIG. 3 is a partial enlarged view of part A in FIG. 2.
Figure 4:
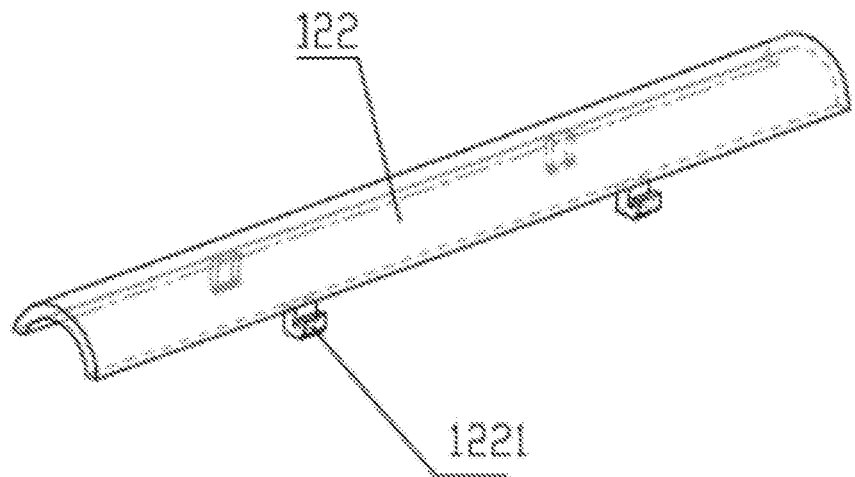
FIG. 4 is a schematic diagram of a turnover buckle structure according to the invention.
Figure 5:
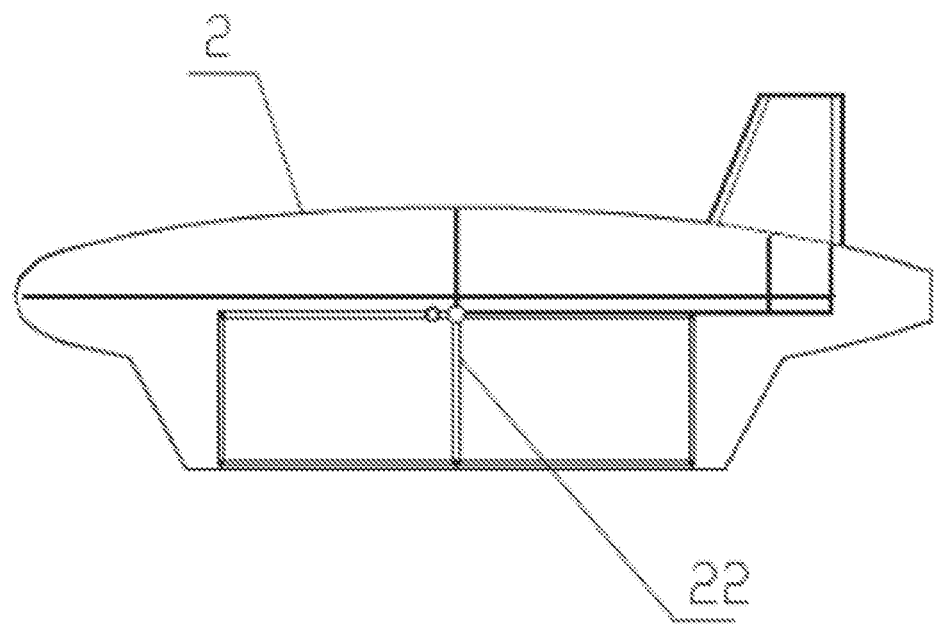
FIG. 5 is a section view of an airbag according to the invention.

The invention will be further described with the figures, but the embodiment of the invention is not limited hereby.

Embodiments

The structure of the falling-resistant and anti-drifting unmanned aerial vehicle according to an embodiment of the invention is as shown in FIGS. 1 to 7, including a main body 1. Four rotor wings 10 are respectively symmetrically distributed on the left and right sides of the front part and rear part of the main body 1, and a wing 3 is respectively arranged on the left and right sides of the middle of the main body 1. An airbag 2 is arranged on each wing 3 and the two airbags 2 are, at the same height, arranged symmetrically on the basis of the main body 1. The airbags 2 are filled with gas lighter than air, such as helium, so that the self-gravity of the aircraft and the weight of a load in an operation cabin can be partially or completely counteracted by the buoyancy of the airbags 2, thus the effective load of the aircraft is increased, and the operation efficiency is improved. In flying, the wings 3 can also provide certain lift force so that the effective load of the aircraft can also be increased. A drug container is mounted at the bottom of the aircraft, and nozzles are generally arranged on the wings 3 or/and the bottom surface of the main body and are positioned between the two airbags 2. In the flying process, through rotation of a plurality of rotor wing 10 of the aircraft, pesticides can be sprayed on the front and back sides of crops.

According to the embodiment, the airbags take the shape of an airship, the airship-shaped airbags 2 can provide lift force like that of a common airship in the flying process so that energy consumption of the aircraft is reduced, and the ability of continuous flight in the flying process can be very well improved. The airbags 2 take the stream line appearance of the airship, and empennages 20 are also arranged at tail ends of the airbags 2, so that due to the structure of the airbags, the resistance of air can be effectively reduced in the flying process, and the ability of continuous flight can be improved.

As the drug loading of the aircraft is limited, the concentration of the drug inside the drug container is generally high, and in addition drug droplets is micro sprayed in the spraying process, so that in the flying process, the drug droplets will be easily drifted in case of side wind blowing, causing that the use efficiency of the drug droplets can be reduced, and the working efficiency of the aircraft can also be reduced. Therefore, bulges 21 protruding downwards are arranged at the bottoms of the airbags 2, which can prevent the drug droplets from influence of side wind, so that the phenomenon of drug droplets drifting caused by side wind is improved. In addition, the cross section of the bulges 21 is gradually smaller from top to bottom, and the front end of the bulges 21 is an arc-shaped surface, so that the flying resistance can be reduced. When the aircraft is not used, the airbags exist as an undercarriage playing a supporting role. If the aircraft is in malfunction or has accidents in aerial operation, buffered landing can be achieved through the airbags when the aircraft falls down, and thus the completeness of the aircraft can be maintained to a very large extent even if the aircraft falls into fields or water.

A first connecting beam 4 and two second connecting beams 5 positioned behind before the first connecting beam 4 are mounted at the bottom of the main body 1, wherein, the first connecting beam 4 transversely penetrates through the bottom of the main body 1, two ends of which extend outside the left and right sides of the main body 1; the wings 3 on two sides of the main body 1 are respectively fixed on the corresponding side of the first connecting beam 4; the main body 1 can be rotated around the first connecting beam 4 for a small amplitude and the rotation angle is within 20 degrees; clamping grooves 11 are respectively formed in the left and right sides of the bottom of the main body 1, the end of each second connecting beam 5 connected with the main body 1 is clamped in the clamping groove 11 on the corresponding side, and the second connecting beams 5 can be moved in the clamping grooves 11, the other ends of the second connecting beams 5 are connected with the wings 3; a bottom plate is arranged at the bottom of the main body 1, which can baffle the opening position of the clamping grooves 11, and meanwhile limit the movement routes of the second connecting beams. Support frameworks 22 wrapped by soft sheaths are arranged inside the airbags, the first connecting beam 4 and the second connecting beams 5 penetrate through the airbags 2 and are both connected with the support frameworks 22. When the second connecting beams 5 are moved in the clamping grooves 11, the main body 1 is rotated around the first connecting beam 4, which can change the included angle between the main body 1 and the wings 3, so as to meet operation and control requirements on the speed and the posture variation of the aircraft in the flying process, and thus the aircraft can fly stably. To ensure the mounting stability of the first connecting beam 4, a groove 13 is formed in a position corresponding to the first connecting beam 4 at the bottom of the main body 1 and a buckle component is arranged in a position corresponding to the groove 13 at the bottom of the main body 1. The buckle component comprises limiting buckles 121 at two ends of the groove 13 and a turnover buckle 122 covering the groove 13. Connecting buckles 1221 are respectively arranged on two sides of the turnover buckle 122. Buckle grooves 14 are respectively formed in positions corresponding to the connecting buckles 1221 at the bottom of the main body 1, and the connecting buckles 1221 of the turnover buckle 122 can be buckled with the buckle grooves 14 at the bottom of the main body 1. When being assembled, the first connecting beam 4 is embedded into the limiting buckles 121 and the grooves 13 is covered by the turnover buckle 122, so that the turnover buckle 122 can be prevented from dissociation through buckling of the connecting buckles 1221 and the buckle grooves 14, the first connecting beam 4 can be limited at the bottom of the main body 1 because of the simultaneous action of the limiting buckles 121 and the turnover buckle 122, thus the first connecting beam 4 will not move at will except rotation in the beam direction, and the first connecting beam 4 can be prevented from being dissociated from the aircraft through the turnover buckle 122 in the flying process. The first connecting beam 4 is buckled by the limiting buckles 121, meanwhile steps or bulges are arranged on the first connecting beam 4 taking the effect of limiting movement under the baffle action of the limiting buckles 121, and thus the first connecting beam 4 does not shake leftwards or rightwards in the flying process.

Figure 6:
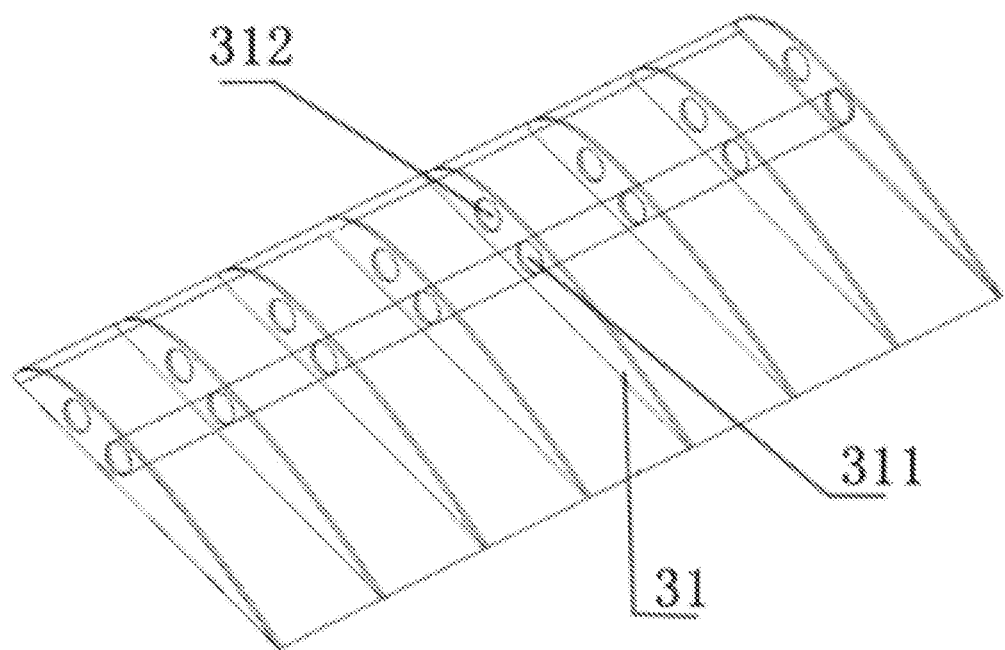
FIG. 6 is a partial schematic diagram of a wing according to the invention.
Figure 7:
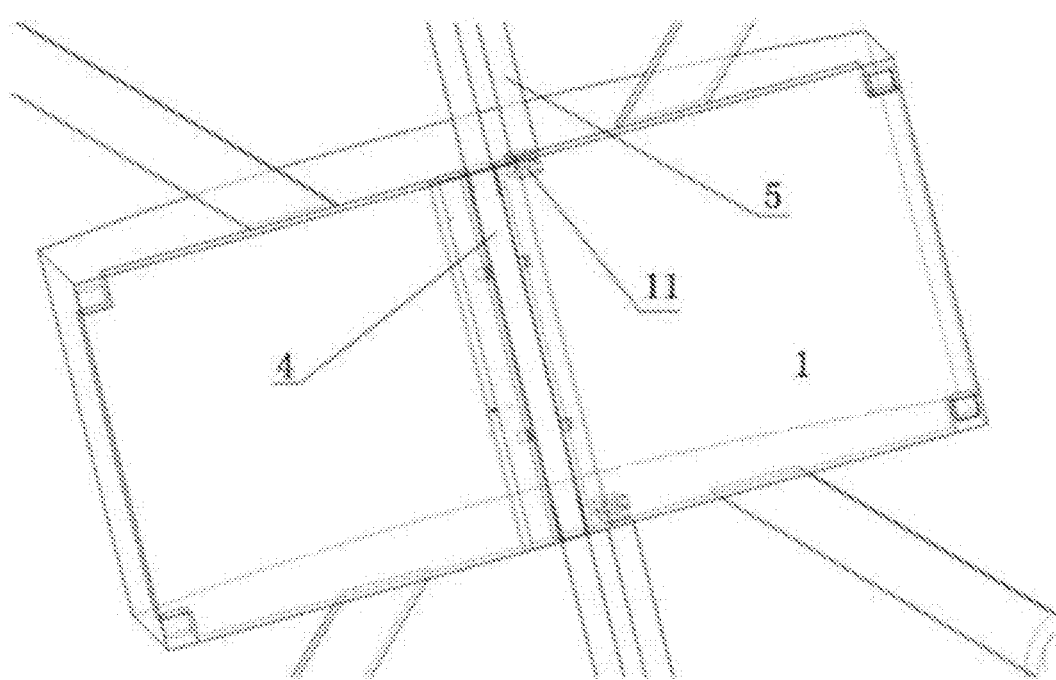
FIG. 7 is an assembling diagram of a main body and connecting beams according to the invention.

According to the embodiment, as shown in FIG. 6, a plurality of wing ribs 31 in a same direction are arranged inside the wings 3. The wing ribs 31 are arranged in an equal distance. The framework formed by all wing ribs 31 is wrapped by a soft sheath. The wing ribs 31 averagely share the pressure of the wings 3 so that original shapes of the wings 3 can be maintained in the flying process. Each wing rib 31 is respectively provided with a first through hole 311 matched with the first connecting beam 4 and second through holes 312 matched with the second connecting beams 5. The center lines of the first through holes 311 of all wing ribs 31 are aligned, and the center lines of the second through holes 312 of all wing ribs 31 are also aligned. The first connecting beam 4 penetrates through the first through holes 311 of all wing ribs 31, the second connecting beams 5 penetrate the second through holes 312 of the wing ribs 31, and the first connecting beam 4 and the second connecting beams 5 are hidden inside the wings 3, so that on one hand, the situation that the appearance attractive is affected as the connecting beams are exposed is avoided, and on the other hand, the situation that the air resistance of the wings 3 is increased as the connecting beams are exposed is avoided.

The soft sheath of the wings 3 and the airbags 2 are airship sheath with anti-explosion properties to increase the security coefficient of the aircraft. The support frameworks 22 of the airbags and the wing ribs 31 of the wings 3 are made of light materials such as an aluminum alloy or a carbon fiber, so that the weight of the aircraft is reduced, the energy consumption is reduced, and the ability of continuous flights improved.

When the falling-resistant and anti-drifting unmanned aerial vehicle is flying, the whole aircraft is connected and fixed by the first connecting beam 4 in the working process, and thus the aircraft does not move too actively. When the second connecting beams 5 are moved in the clamping grooves 11, the included angles between the main body and the airbags 2 and the wings 3 can be simultaneously adjusted, then the aircraft can fly stably, and the operation and control requirements on the speed and the posture variation of aircraft in the flying process are met. Under the action of the first connecting beam 4 and the second connecting beams 5 connected to the clamping grooves 11 in the main body 1, a steering gear control is arranged at the bottom of the main body 1 to control the relative movement of the second connecting beams 5 in the clamping grooves 11, and then the second connecting beams 5 can be moved within an allowable range in the clamping grooves 11, which can keep the wings 3 lever, and incline the main body 1 to meet requirements of different flying postures. Then, users on the ground can change inclination angles of the unmanned aerial vehicle main body 1 by manually controlling the steering gear to adjust the postures of the aircraft in the air, thus the aircraft can fly stably. When the aircraft inclines during moving forwards, effective flying postures of the wings can be maintained by reducing the included angles between the main body 1 and the wings, then both the lift force is provided to flying and the energy consumption is reduced, and the ability of continuous flight is improved.

The embodiments of the invention do not limit the protection range of the invention. Any modification, equivalent replacement, improvement and the like within principles of the invention are included by the protection ranges of the claims of the invention.

The invention claimed is:

1. An unmanned aerial vehicle comprising:
   a main body,
   airbags connected with the main body and respectively arranged on two opposite sides of the main body;
   wings respectively arranged on two opposite sides of the main body and the airbags are fixed on the wings, wherein the main body is connected with the wings through a first connecting beam and second connecting beams; and
   support frameworks arranged inside the airbags, wherein the first connecting beam and the second connecting beams penetrate through the airbags and the first connecting beam and the second connecting beams are both connected with the support frameworks;
   wherein the first connecting beam penetrates through two sides of the bottom of the main body; the wings on two sides of the main body are respectively fixed on the first connecting beam on two sides of the main body; the main body is rotated around the first connecting beam; clamping grooves are respectively arranged on two opposite sides of the bottom of the main body; the end of each second connecting beam connected with the main body is clamped inside each clamping groove and the second connecting beams is moved inside the clamping grooves.

2. The unmanned aerial vehicle according to claim 1, wherein at least one rotor wing is arranged on the main body and the airbags take the shape of an airship.

3. The unmanned aerial vehicle according to claim 1, wherein bulges protruding downwards are arranged at the bottoms of the airbags.

4. The unmanned aerial vehicle according to claim 1, wherein the airbags are filled with gas lighter than air.

5. The unmanned aerial vehicle according to claim 1, wherein a plurality of wing ribs which are arranged in a same direction are arranged inside the wings; the outer sides of the wing ribs are wrapped by soft sheath; a first through hole matched with the first connecting beam and second through holes matched with the second connecting beams are respectively formed in each wing rib; the first connecting beam penetrates through the first through hole of each wing rib and the second connecting beams penetrate through the second through holes of the wing ribs.

6. The unmanned aerial vehicle according to claim 1, wherein a buckle component is arranged at the bottom of the main body, through which the first connecting beam is fixed at the bottom of the main body.

* * * * *